US011825561B2

(12) United States Patent
Kundu et al.

(10) Patent No.: US 11,825,561 B2
(45) Date of Patent: Nov. 21, 2023

(54) CHANNEL ACCESS SHARING DURING A RANDOM ACCESS PROCEDURE FOR NR-UNLICENSED NETWORKS

(71) Applicant: Intel Corporation, Santa Clara, CA (US)

(72) Inventors: Lopamudra Kundu, Sunnyvale, CA (US); Yongjun Kwak, Portland, OR (US); Seau S. Lim, Swindon (GB); Gang Xiong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 16/942,893

(22) Filed: Jul. 30, 2020

(65) Prior Publication Data

US 2020/0413485 A1 Dec. 31, 2020

Related U.S. Application Data

(60) Provisional application No. 62/910,044, filed on Oct. 3, 2019, provisional application No. 62/884,822, filed on Aug. 9, 2019.

(51) Int. Cl.
*H04W 88/06* (2009.01)
*H04W 72/0446* (2023.01)
(Continued)

(52) U.S. Cl.
CPC ....... *H04W 88/06* (2013.01); *H04W 72/0446* (2013.01); *H04W 72/0453* (2013.01);
(Continued)

(58) Field of Classification Search
CPC ............ H04W 88/06; H04W 72/0446; H04W 72/0453; H04W 72/14; H04W 74/0808; H04W 80/02
(Continued)

(56) References Cited

U.S. PATENT DOCUMENTS

| 10,420,139 B2 * | 9/2019 | Damnjanovic | .......... H04L 5/005 |
| 2020/0059969 A1 * | 2/2020 | Agiwal | ............. H04W 74/0833 |

(Continued)

FOREIGN PATENT DOCUMENTS

| CN | 113545163 A * | 10/2021 | ........... H04L 1/1819 |
| WO | WO-2020031819 A1 * | 2/2020 | ........ H04W 72/0453 |

OTHER PUBLICATIONS

ETSI TS 138 213 V15.6.0 (Jul. 2019) (Year: 2019).*

*Primary Examiner* — Intekhaab A Siddiquee
(74) *Attorney, Agent, or Firm* — Schwegman Lundberg & Woessner, P.A.

(57) ABSTRACT

An apparatus for use in a UE includes processing circuitry coupled to a memory. To configure the UE for a 4-step random access procedure with a gNB in a 5G-NR network, the processing circuitry is to encode a first message for transmission to the gNB using a PRACH, the first message including a random access preamble. A second message received from the gNB in response to the first message is decoded. The second message includes a MAC RAR with an uplink (UL) grant and an indication of an LBT procedure type or a channel access and CP extension. An LBT procedure based on the LBT procedure type or the channel access and CP extension provided in the indication is performed. Data is encoded for transmission to the gNB based on successful completion of the LBT procedure, the transmission using a PUSCH, and a UL resource indicated by the UL grant.

20 Claims, 8 Drawing Sheets

(51) Int. Cl.
     *H04W 72/0453*     (2023.01)
     *H04W 72/23*       (2023.01)
     *H04W 74/08*       (2009.01)
     *H04W 80/02*       (2009.01)

(52) U.S. Cl.
     CPC ....... *H04W 72/23* (2023.01); *H04W 74/0808* (2013.01); *H04W 80/02* (2013.01)

(58) Field of Classification Search
     USPC .......................................................... 370/329
     See application file for complete search history.

(56) References Cited

U.S. PATENT DOCUMENTS

2020/0404708 A1* 12/2020 Zhang .................... H04W 16/14
2021/0168858 A1*  6/2021 Liu ........................ H04L 5/0091

\* cited by examiner

| | |
|---|---|
| ~~R~~ LBT ~~type~~ / Timing Advance Command | Oct 1 |
| Timing Advance Command / UL Grant | Oct 2 |
| UL Grant | Oct 3 |
| UL Grant | Oct 4 |
| UL Grant | Oct 5 |
| Temporary C-RNTI | Oct 6 |
| Temporary C-RNTI | Oct 7 |

FIG. 4

| | | | |
|---|---|---|---|
| R | LBT type | Timing Advance Command | Oct 1 |
| Timing Advance Command | | UL Grant | Oct 2 |
| UL Grant | | | Oct 3 |
| UL Grant | | | Oct 4 |
| UL Grant | | | Oct 5 |
| Temporary C-RNTI | | | Oct 6 |
| Temporary C-RNTI | | | Oct 7 |

FIG. 5

CHANNEL ACCESS SHARING DURING A RANDOM ACCESS PROCEDURE FOR NR-UNLICENSED NETWORKS

PRIORITY CLAIM

This application claims the benefit of priority to the following provisional applications:

U.S. Provisional Patent Application Ser. No. 62/884,822, filed Aug. 9, 2019, and entitled "ENABLING CHANNEL ACCESS SHARING BETWEEN MSG2 AND MSG3 TRANSMISSIONS DURING RANDOM ACCESS PROCEDURE FOR NR-UNLICENSED"; and U.S. Provisional Patent Application Ser. No. 62/910,044, filed Oct. 3, 2019, and entitled "ENABLING CHANNEL ACCESS SHARING BETWEEN MSG2 AND MSG3 TRANSMISSIONS DURING RANDOM ACCESS PROCEDURE FOR NR-UNLICENSED."

Each of the provisional patent application identified above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for channel access sharing between message 2 (Msg2) and message 3 (Msg3) transmissions during a random access procedure for NR-U networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for channel access sharing between Msg2 and Msg3 transmissions during a random access procedure for NR-U networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 4 illustrates a modified MAC RAR with the reserved field "R" assigned as a Listen Before Talk (LBT) procedure type, in accordance with some aspects.

FIG. 5 illustrates a modified MAC RAR with bits from the Timing Advance Command used for indicating an LBT procedure type, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
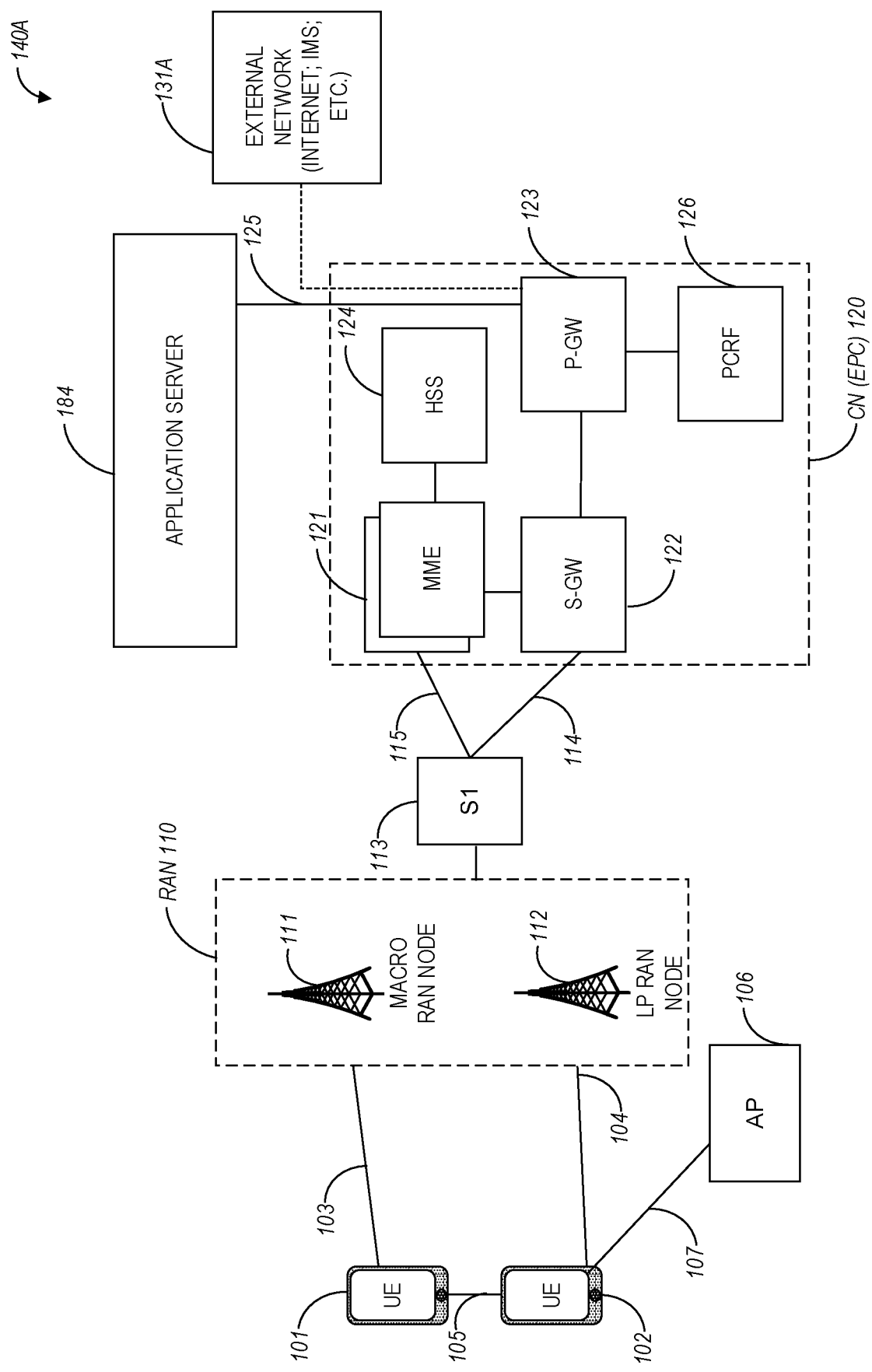
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM filter bank-based multicarrier (FBMC). OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
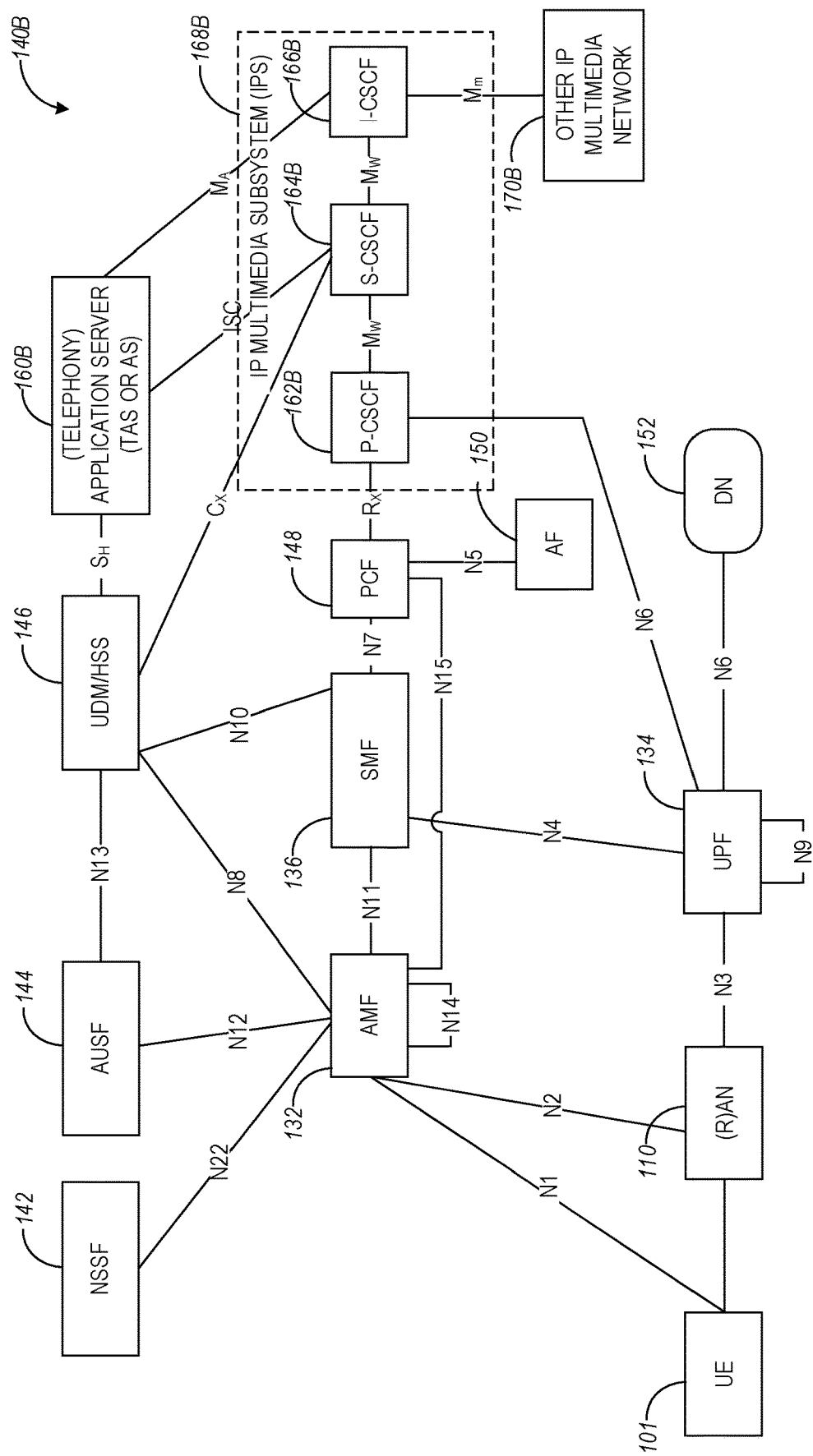
FIG. 1B and FIG. C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown). N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown). N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
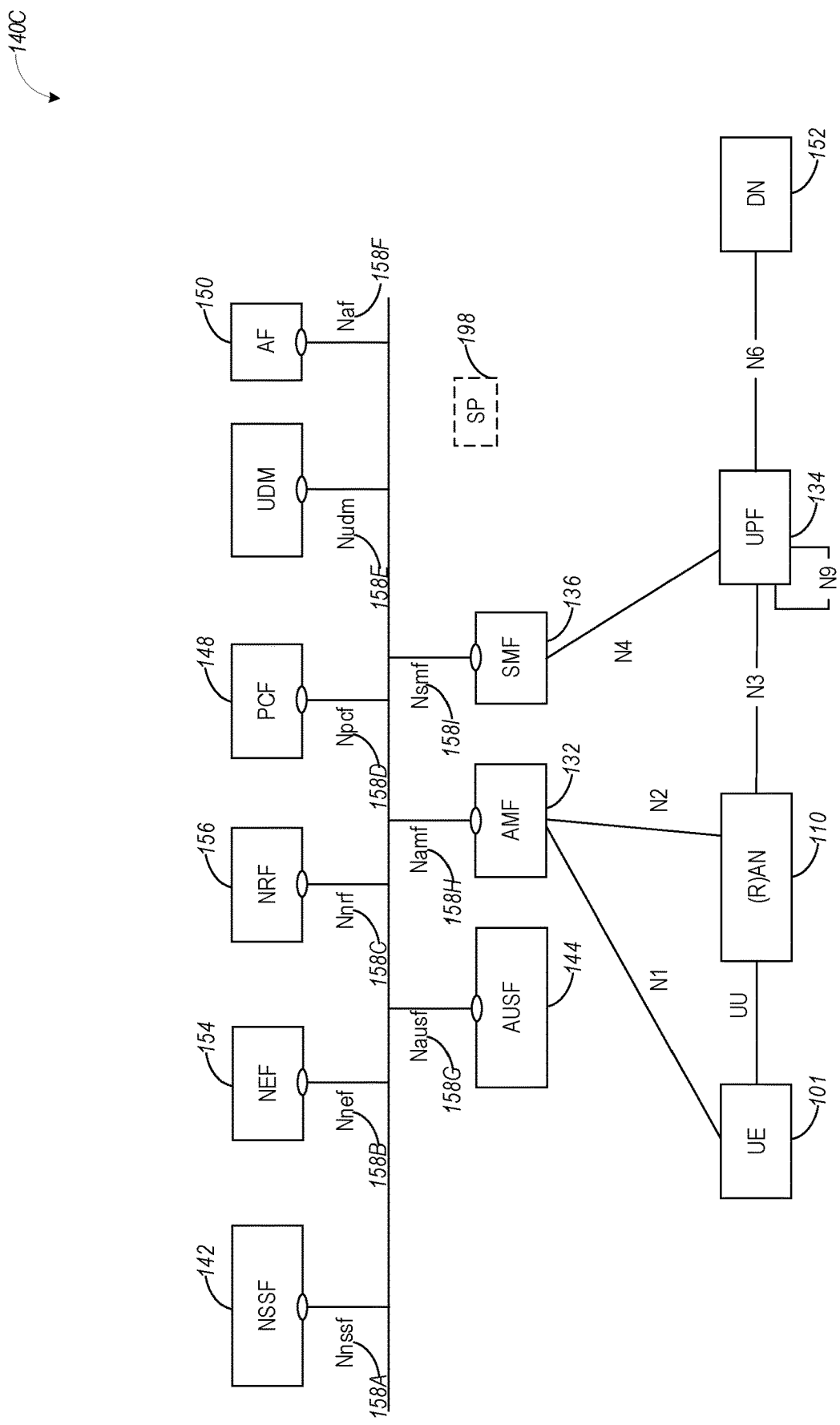

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154). Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed in connection with FIG. 2-FIG. 6.

As used herein, the terms "clear channel assessment", "channel access and cyclic prefix (CP) extension", and "LBT procedure" are interchangeable. As used herein, the terms "LBT type", "LBT category", and "LBT procedure type" are interchangeable.

The channel access mechanism aspect is one of the fundamental building blocks for NR-unlicensed that is essential for any deployment options. The adoption of Listen-Before-Talk (LBT) in LTE (Long Term Evolution) based LAA (License Assisted Access) system was crucial in achieving fair coexistence with the neighboring systems sharing the unlicensed spectrum in addition to fulfilling the regulatory requirements. The LBT based channel access mechanism fundamentally resembles the WLAN's Carrier Sense Multiple Access with Collision Avoidance (CSMA/CA) principles. Any node that intends to transmit in an unlicensed spectrum first performs a channel sensing operation before initiating any transmission. An additional random back-off mechanism is adopted to avoid collisions when more than one node senses the channel as idle and transmits simultaneously. The random back-off mechanism can be associated with a different LBT procedure type, such as Category 1, Category 2, or Category 4 LBT procedure type.

In NR, a device in idle/inactive state access the network to request typically for connection set-up through a series of functions/procedures commonly known as a random access process. Similar functionality can be used by a device in a connected mode as well, for example, for re-establishing uplink synchronization. NR uses a four-step random access procedure and a two-step random access procedure for contention-based random access (CBRA) or contention-free random access (CFRA).

Figure 2:
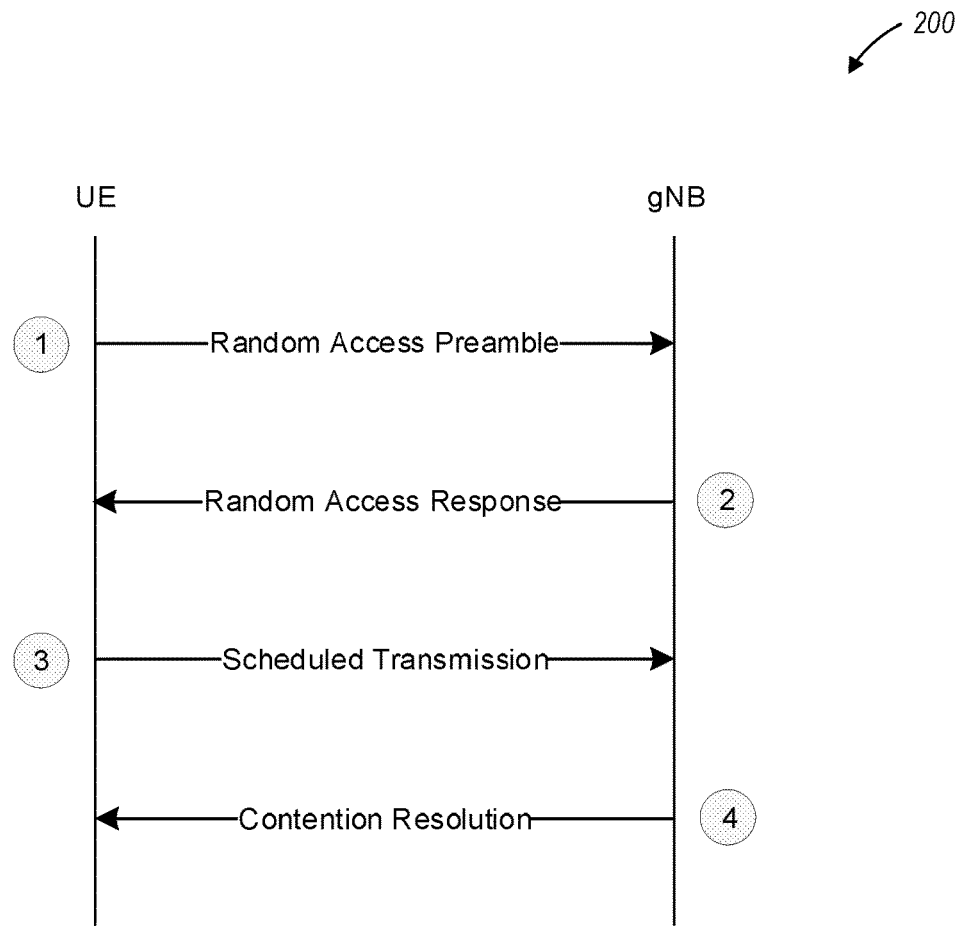
FIG. 2 illustrates a swimlane diagram of a 4-step contention-based random access (CBRA) procedure, in accordance with some aspects.

FIG. 2 illustrates a swimlane diagram 200 of a 4-step contention-based random access (CBRA) procedure, in accordance with some aspects. For CBRA, the random access procedure consists of the following steps illustrated in FIG. 2:

Step 1 (Message 1 transmission): device transmits a preamble, also known as a physical random access channel (PRACH).

Step 2 (Message 2 transmission): network transmits a random access response (RAR) message indicating reception of the preamble and providing timing alignment command (based on the timing of the received preamble) for the device to adjust its transmission timing.

Step 3 (Message 3 transmission): Device transmits uplink RRC connection request based on the UL grant provided by RAR.

Step 4 (Message 4 transmission): Network transmits contention resolution in the downlink, to resolve any potential collision due to simultaneous transmission of the same preamble from multiple devices within the cell. If successful, message 4 also transfers the device to a connected state.

To fulfill regulatory requirements and provide a global solution of a unified framework, NR-based unlicensed access will also use LBT based channel access mechanisms. Due to LBT, the transmission of message 1/2/3/4 during CBRA can be impacted, while operating in an unlicensed spectrum. For example, LBT may need to be performed at the UE side before PRACH preamble can be transmitted or at the gNB side before a MAC RAR in response to the preamble reception can be transmitted. The design and contents of random access messages in the NR-licensed system, which does not need to cope with such channel access related contention, therefore, may not be sufficient for random access procedure in an unlicensed spectrum.

In the above context, disclosed techniques provide enhancements of Msg2 (RAR) to cope with LBT related congestion for Msg3 transmission in the unlicensed spectrum. Additional enhancements include details of the signaling aspect to enable channel access type indication for Msg3 transmission via MsgB RAR.

Channel Occupancy Time (COT) Sharing Between Msg2 and Msg3 Transmissions During Random Access Process Over NR-Unlicensed Spectrum In one embodiment, if the gNB receives PRACH from a UE, the gNB first performs Clear Channel Assessment (CCA) and sends Msg2 (Random Access Response or RAR) to UE(s) and indicates channel access type (or the LBT procedure type such as the LBT category) to the UE(s) to send Msg3 transmission (potentially with the possibility of less LBT congestion in some scenarios, for example, when gNB shares the channel to the UE), by indicating to the UE(s) the CCA type and/or CP extension to be used to gain the access of the channel for Msg3 transmission.

In one option, gNB may share the channel access information (e.g. the LBT category to be used by the UE to access the channel for msg3 transmission) with the UE via one or more of the RAR UL grant fields in the MAC RAR. In particular, the gNB can indicate the LBT category type to the UE via one or more existing RAR UL grant field bits, without increasing the number of bits in the RAR UL grant (e.g., 27 bits in Rel-15 NR). The UE may then perform the LBT procedure of the indicated type, before transmitting Msg3.

As one example, the "CSI request" field that is reserved in Rel-15 NR specification (Table 8.2-1 of 3GPP TS 38.213 v15.5.0) can be repurposed to indicate the LBT procedure type (e.g., Cat. 2 or Cat. 4 LBT) to the UE, where bit '0' may indicate Cat. 2 and bit "1" Cat. 4 LBT, or vice versa. While the indication of Cat. 2 LBT to the UE implies that the channel access gained by gNB for the transmission of Msg2 is being shared with the UE and the UE needs to only perform a single shot Cat. 2 LBT to get channel access for Msg3 transmission, an indication of Cat. 4 LBT implies channel is not being shared between gNB and UE and UE needs to gain access to the channel by itself.

The field name can be changed from "CSI request" to "LBT type" as shown in TABLE 1 below:

TABLE 1

Modified RAR Grant Content Field (change in LSB)

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| LBT type | 1 |

In an example embodiment, the RAR UL grant field "Frequency hopping flag" can be repurposed to indicate the LBT procedure type to the UE, disabling the frequency hopping option for Msg3. Due to regulatory requirements in terms of occupied channel bandwidth (OCB) for the usage of an unlicensed spectrum, the Msg3 PUSCH transmission may be based on distributed frequency allocation (e.g., interlace-based) and hence frequency hopping may not be necessary (on top of interlaced PUSCH) for frequency diversity. Therefore, the "Frequency hopping flag" field in Rel-15 NR specification (Table 8.2-1 of 3GPP TS 38.213 v15.5.0) can be repurposed as "LBT type" to indicate the PBT procedure type (or LBT category, such as Cat. 2 or Cat. 4 LBT) to the UE, wherein bit '0' may indicate Cat. 2 and bit "1" Cat. 4 LBT, or vice versa.

Table 8.2-1 of 3GPP TS 38.213 v15.5.0 can be modified to include LBT type as indicated in TABLE 2 below:

TABLE 2

Modified RAR Grant Content Field Size (change in MSB)

| RAR grant field | Number of bits |
| --- | --- |
| LBT type | 1 |
| PUSCH frequency resource allocation | 14 |
| PUSCH time resource allocation | 4 |
| MCS | 4 |
| TPC command for PUSCH | 3 |
| CSI request | 1 |

As yet another embodiment, more than one RAR UL grant field may be repurposed to indicate the LBT procedure (or LBT category) type. In particular, the "Frequency hopping flag" field and the "CSI request" field can be jointly repurposed to indicate the LBT procedure type using 2-bits (e.g., indicating one of Cat. 1, Cat. 2, Cat. 4), where out of 4 possible bit combinations (e.g., '00', '01' '11' and '10'), any three might be used to indicate Cat. 1/2/4 LBT. Here, the indication of Cat. 1/2 implies channel occupancy time (COT) sharing between gNB and UE, while Cat. 4 indication implies no COT sharing between gNB and UE. If the Cat.1 LBT is indicated by the RAR UL grant field, the time gap between the Msg2 and Msg3 may be less than 16 us. Therefore, the PUSCH time resource allocation information needs to indicate the proper time for Msg3 transmissions. Alternatively, the UE may start transmission of Msg3 16 us after the reception of Msg2 by neglecting PUSCH time resource allocation information. For the latter case, the PUSCH time resource allocation information can be used for other purposes.

Table 8.2-1 of 3GPP TS 38.213 v15.5.0 can be modified to include LBT type as indicated in TABLE 3-1 and TABLE 3-2 below:

TABLE 3-1

Modified RAR Grant Content Field (increase in LSB field Size)

| RAR grant field | Number of bits |
| --- | --- |
| PUSCH frequency resource allocation | 14 |
| PUSCH time resource allocation | 4 |
| MCS | 4 |
| TPC command for PUSCH | 3 |
| LBT type | 2 |

TABLE 3-2

Modified RAR Grant Content Field (increase in MSB field Size)

| RAR grant field | Number of bits |
| --- | --- |
| LBT type | 2 |
| PUSCH frequency resource allocation | 14 |
| PUSCH time resource allocation | 4 |
| MCS | 4 |
| TPC command for PUSCH | 3 |

As yet another example, some of the unused bits in the "PUSCH frequency resource allocation" field can be used to indicate the LBT category type. In particular, for interlaced based PUSCH resource allocation for NR-unlicensed, maximum 10-bits (or less) may be required for interlace based frequency domain resource allocation indication for Msg3 PUSCH. Out of the remaining 4-bits, any 1~2-bits can be used to indicate LBT type (cat. 1/2/4). If the Cat.1 LBT is indicated by the RAR grant field, the time gap between the Msg2 and Msg3 should be less than 16 us. Therefore, the PUSCH time resource allocation information needs to indicate the proper time for Msg3 transmissions. Alternatively, the UE may start transmission of Msg3 16 us after the reception of Msg2 by neglecting PUSCH time resource allocation information. For the latter case, the PUSCH time resource allocation information can be used for other purposes. One option would be to keep the "RAR grant field" and "Number of bits" in Table 8.2-1: Random Access Response Grant Content field size (3GPP TS38.213 v15.5.0) unchanged and just reinterpret the 1~2 MSB bits or 1~2 LSB bits (or any other combination of bit positions) as bits indicating LBT types. Another option would be to modify the table by reducing the number of bits for the "PUSCH frequency resource allocation" field and assigning those bits to a new RAR UL grant field, such as "LBT type". The new RAR UL grant field can be included either at the beginning of the table (i.e., as MSB bits) or at the end of the table (i.e., as LSB bits) and anywhere in between. In that case, several ways to modify Table 8.2-1 of 3GPP TS 38.213 v15.5.0 to include LBT type would be as indicated below in TABLES 4-1, 4-2, and 4-3:

TABLE 4-1

Enhanced RAR Grant Content Field (new field bits as "MSB")

| RAR grant field | Number of bits |
|---|---|
| LBT type | 2 |
| Frequency hopping flag | 1 |
| PUSCH frequency resource allocation | 12 |
| PUSCH time resource allocation | 4 |
| MCS | 4 |
| TPC command for PUSCH | 3 |
| CSI request | 1 |

TABLE 4-2

Enhanced RAR Grant Content Field (new field bits as "LSB")

| RAR grant field | Number of bits |
|---|---|
| Frequency hopping flag | 1 |
| PUSCH frequency resource allocation | 12 |
| PUSCH time resource allocation | 4 |
| MCS | 4 |
| TPC command for PUSCH | 3 |
| CSI request | 1 |
| LBT type | 2 |

TABLE 4-3

Enhanced RAR Grant Content Field (new field bits in intermediate bit position)

| RAR grant field | Number of bits |
|---|---|
| Frequency hopping flag | 1 |
| LBT type | 2 |
| PUSCH frequency resource allocation | 12 |
| PUSCH time resource allocation | 4 |
| MCS | 4 |
| TPC command for PUSCH | 3 |
| CSI request | 1 |

As another alternative, any other RAR UL grant field bits (e.g., "PUSCH time resource allocation" or "MCS" or "TPC command for PUSCH") may be modified to extract 1-2 bits and repurpose these bits to indicate the LBT type.

In another embodiment, the gNB may share the channel access information (e.g., the LBT category to be used by the UE to access the channel) with the UE via a RAR UL grant field by introducing new RAR grant field bits in Table 8.2-1 of 3GPP TS 38.213 v15.5.0, thereby increasing the number of bits in RAR UL grant (e.g., 27 bits in Rel-15 NR) by n bits (e.g. n=1 bit). The new field can be introduced either at the beginning of the table (i.e., as MSB bits) or at the end of the table (i.e., as LSB bits) or anywhere in the middle of the table. Such new "LBT type" bit can be introduced in the MAC RAR UL grant field as indicated by TABLES 5-1, 5-2, and 5-3 below:

TABLE 5-1

Enhanced RAR Grant Content Field (introducing additional bit as "MSB")

| RAR grant field | Number of bits |
|---|---|
| LBT type | 1 |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

TABLE 5-2

Enhanced RAR Grant Content Field (introducing additional bit as "LSB")

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| LBT type | 1 |

TABLE 5-3

Enhanced RAR Grant Content Field (introducing additional bit in intermediate bit position)

| RAR grant field | Number of bits |
|---|---|
| Frequency hopping flag | 1 |
| PUSCH frequency resource allocation | 14 |
| PUSCH time resource allocation | 4 |
| LBT type | 1 |
| MCS | 4 |
| TPC command for PUSCH | 3 |
| CSI request | 1 |

Figure 3:
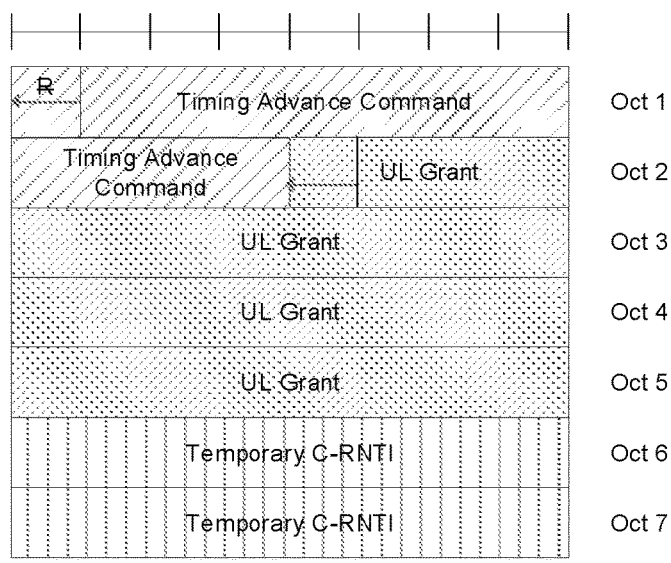
FIG. 3 illustrates a modified and realigned media access control (MAC) random access response (RAR) with reserved field "R" assigned to Timing Advance Command and the UL Grant field boundary shifted left on October 2, in accordance with some aspects.

FIG. 3 illustrates a modified and realigned MAC RAR 300 with reserved field "R" assigned to Timing Advance Command and the UL Grant field boundary shifted left on October 2, in accordance with some aspects.

One way to accommodate the additional bit requirement of the UL grant field in octet-aligned MAC RAR would be by consuming the 1 bit reserved bit in MAC RAR within the "Timing Advance Command" field and realigning the field in the octet grid of MAC RAR, as illustrated in FIG. 3.

FIG. 4 illustrates a modified MAC RAR 400 with the reserved field "R" assigned as an LBT procedure type, in accordance with some aspects.

In another embodiment, instead of changing the content of the RAR UL grant field, the LBT procedure type is indicated through the 1-bit reserved field in the MAC RAR payload, as shown in FIG. 4. The first bit of the first octet in octet-aligned MAC RAR is assigned bit "0" in FIG. 6.2.3-1 of 3GPP TS 38.321 v15.5.0, which can be repurposed to indicate the LBT type, where a bit "0" may indicate Cat. 2 LBT and a bit "1" may indicate Cat. 4 LBT or vice versa, as illustrated in FIG. 4

In another embodiment, a combination of using the MAC RAR with the reserved field "R" and the repurpose bit in the UL grant (e.g. using CSI request) may be used to indicate Cat. 1, Cat. 2, or Cat. 4 LBT procedure type. An example of the field definition of the reserved bit and the repurpose bit in the UL grant is indicated in TABLE 6 below:

TABLE 6

| R field in RAR | Repurpose bit in the UL grant | CAT Type |
| --- | --- | --- |
| 0 | 0 | CAT 1 |
| 0 | 1 | CAT 2 |
| 1 | 0 | CAT 4 |
| 1 | 1 | Spare |

FIG. 5 illustrates a modified MAC RAR 500 with bits from the Timing Advance Command used for indicating an LBT procedure type, in accordance with some aspects.

In another embodiment, the LBT procedure type is indicated through 1 bit (or 2 bits) using a part of the timing advanced command, as shown in FIG. 5. In this case, the total number of bits for the timing advanced command is reduced from 12 to 11 (or 10) bits. This is based on the assumption that NR-U is not for a very large cell scenario and large TA is not required.

Signaling Aspect to Enable Channel Access Type Indication (e.g., LBT Procedure Type Indication) for Msg3 Transmission Via MsgB RAR In another embodiment, when a 2-step RACH (e.g., 2-step CBRA) is applied for the NR system operating in an unlicensed spectrum, successRAR and fallbackRAR may be included in MsgB of the 2-step RACH. In some aspects, successRAR is included when the gNB successfully detects the MsgA PRACH preamble and decodes the MsgA PUSCH for a UE. The fallbackRAR is included when the gNB successfully detects the MsgA PRACH preamble but fails to decode the MsgA PUSCH, and subsequently informs the UE to switch from a 2-step RACH to a 4-step RACH procedure.

In some aspects, for a fallbackRAR similar to Msg2 in the 4-step RACH procedure, the LBT procedure type (e.g., the LBT category or channel access and CP extension) may be explicitly included in a MAC sub-protocol data unit (PDU). More specifically, the above embodiments for carrying the LBT procedure type (i.e., the LBT category or channel access and CP extension) in the MAC subPDU in Msg2 can be employed for carrying the LBT procedure type in the fallbackRAR.

In some aspects, for a successRAR, the LBT procedure type may be explicitly indicated to the UE in the MAC subPDU. For example, the LBT procedure type may be included without changing the size of other fields in successRAR. For instance, it may be included before or after the 12 bits of the timing advance command and the 48 bits UE contention resolution ID.

In an example embodiment, when the LBT procedure type is indicated by 1-bit in the aforementioned embodiments, a priority class for Cat. 4 LBT can be pre-configured. For example, it can be fixed as the lowest priority class value (i.e., highest priority class) or any other priority call value available. Additionally, when more than one bit is available to indicate the LBT procedure type in the aforementioned embodiments, the priority class value can either be pre-configured or can be dynamically indicated in conjunction with the LBT type, when applicable.

In an example embodiment, a system and method of wireless communication for a 5G NR system operating in the unlicensed spectrum (NR-U) is disclosed. A method of sharing channel access information with the UE during Msg2 transmission is determined as a part of a random access procedure. In some aspects, a RAR is transmitted by the gNB with channel access information (e.g., the LBT procedure type or channel access and CP extension to be used by the UE) embedded within the transmission. In some embodiments, the gNB sends the channel access information to the UE via the RAR UL grant. In some embodiments, the gNB indicates the LBT category type to the UE via one or more existing RAR grant field bits, without increasing the number of bits in the RAR UL grant (e.g. 27 bits in Rel-15 NR). In some embodiments, the gNB repurposes one or more of existing RAR UL grant fields in NR (e.g. "CSI request", "Frequency hopping flag" etc.) to indicate the LBT type to the UE. In some embodiments, the gNB repurposes one or more bits of an existing RAR UL grant field in NR (e.g. "PUSCH frequency resource allocation") to indicate the LBT type or channel access and CP extension to the UE. In some embodiments, the gNB indicates the LBT category type (or channel access and CP extension) to the UE via introducing new RAR grant field bit(s), thereby increasing the number of bits in the RAR UL grant (from 27 bits in Rel-15 NR). In some embodiments, the gNB accommodates additional bits required for the UL grant indication within other RAR fields, e.g. reserved bit, timing advanced command, etc. In some embodiments, the gNB indicates to the UE the LBT priority class along with the LBT type. In some embodiments, the gNB indicates to the UE the LBT category type (or channel access and CP extension) in a successRAR or a fallbackRAR during a 2-step RACH procedure.

Figure 6:
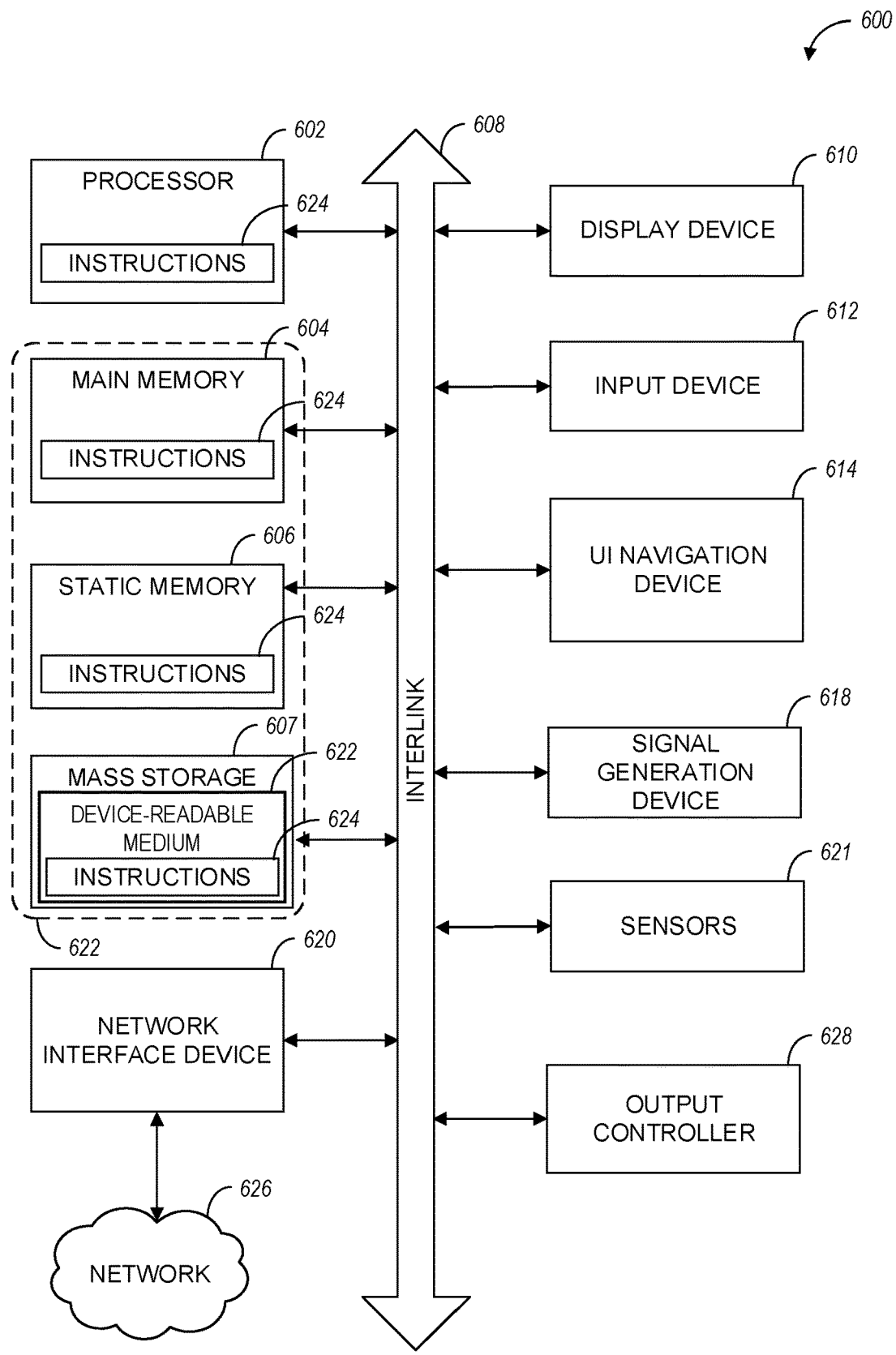
FIG. 6 illustrates a block diagram of a communication device such as an evolved Node-B (eNB), a new generation Node-B (gNB), an access point (AP), a wireless station (STA), a mobile station (MS), or user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented in tangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a standalone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612, and UI navigation device 614 may be a touchscreen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624. The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multipleoutput (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a user equipment (UE), the apparatus comprising:
   processing circuitry, wherein to configure the UE for a 4-step contention-based random access (CBRA) procedure with a next generation Node-B (gNB) in a 5G-New Radio (NR) communication network, the processing circuitry is to:
      during a first step of the 4-step CBRA procedure, encode a first message (Msg1) for transmission to the gNB, the first message including a random access preamble communicated on a physical random access channel (PRACH);
      during a second step of the 4-step CBRA procedure, decode a second message (Msg2) received from the gNB in response to the first message, the Msg2 including a random access response (RAR) with a physical downlink control channel (PDCCH), the PDCCH including a scheduled uplink (UL) grant with UL resources and an indication of a channel access type associated with an UL transmission using the UL grant, the channel access type indicating whether shared spectrum channel access is enabled for the UL transmission;
      during a third step of the 4-step CBRA procedure, encode a third message (Msg3) for a physical uplink shared channel (PUSCH) transmission to the gNB using the scheduled UL grant, the PUSCH transmission using shared spectrum when the shared spectrum channel access is enabled, and the PUSCH transmission using non-shared spectrum sensed by the UE to be idle during a channel access procedure when the shared spectrum channel access is not enabled; and
      during a fourth step of the 4-step CBRA procedure, decode a fourth message (Msg4) received from the gNB, the Msg4 associated with contention resolution; and
   a memory coupled to the processing circuitry and configured to store the RAR.

2. The apparatus of claim 1, wherein the Msg2 includes a RAR grant field with the scheduled UL grant.

3. The apparatus of claim 2, wherein the scheduled UL grant within the RAR grant field includes a PUSCH frequency resource allocation and a PUSCH time resource allocation for the transmission of Msg3.

4. The apparatus of claim 3, wherein the RAR grant field includes the indication of the channel access type.

5. The apparatus of claim 4, wherein the indication of the channel access type is 2 bits, and wherein the PUSCH frequency resource allocation is reduced from 14 bits to 12 bits when the RAR grant field includes the indication of the channel access type.

6. The apparatus of claim 1, wherein the channel access procedure is one of a Category 1 Listen-Before-Talk (LBT) procedure, a Category 2 LBT procedure, and a Category 4 LBT procedure.

7. The apparatus of claim 6, wherein the RAR includes an UL grant content field with the scheduled UL resources, and wherein the UL grant content field comprises an LBT type field or a channel access and CP extension type field indicating a type of the LBT procedure.

8. The apparatus of claim 7, wherein the LBT type field or the channel access and CP extension type field is 2 bits.

9. The apparatus of claim 1, wherein the RAR is a fallback RAR informing the UE to switch from a 2-step CBRA to the 4-step CBRA procedure.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors of a next generation Node-B (gNB), the instructions to configure the gNB for a 4-step contention-based random access (CBRA) procedure with a user equipment (UE) in a 5G-New Radio (NR) communication network, and to cause the gNB to:
   during a first step of the 4-step CBRA procedure, decode a first message (Msg1) received from the UE, the first message including a random access preamble communicated on a physical random access channel (PRACH);
   during a second step of the 4-step CBRA procedure, encode a second message (Msg2) for transmission to the UE in response to the first message, the Msg2 including a random access response (RAR) with a physical downlink control channel (PDCCH), the PDCCH including a scheduled uplink (UL) grant with UL resources and an indication of a channel access type associated with an UL transmission using the UL grant, the channel access type indicating whether shared spectrum channel access is enabled for the UL transmission;
   during a third step of the 4-step CBRA procedure, decode a third message (Msg3) received via a physical uplink shared channel (PUSCH) transmission from the UE using the scheduled UL resources, the PUSCH transmission using shared spectrum when the shared spectrum channel access is enabled, and the PUSCH transmission using non-shared spectrum sensed by the UE to be idle during a channel access procedure when the shared spectrum channel access is not enabled; and
   during a fourth step of the 4-step CBRA procedure, encode a fourth message (Msg4) for transmission to the UE, the Msg4 associated with contention resolution.

12. The non-transitory computer-readable storage medium of claim 11, wherein the Msg2 includes a RAR grant field with the UL grant.

13. The non-transitory computer-readable storage medium of claim 12, wherein the UL grant within the RAR grant field includes a PUSCH frequency resource allocation and a PUSCH time resource allocation for the transmission of Msg3.

14. The non-transitory computer-readable storage medium of claim 13, wherein the RAR grant field includes the indication of the channel access type.

15. The non-transitory computer-readable storage medium of claim 14, wherein the indication of the channel access type is 2 bits, and wherein the PUSCH frequency resource allocation is reduced from 14 bits to 12 bits when the RAR grant field includes the indication of the channel access type.

16. An apparatus to be used in a next generation Node-B (gNB), the apparatus comprising:
at least two antennas;
front-end circuitry coupled to the at least two antennas; and
baseband processing circuitry coupled to the front-end circuitry, wherein to configure the gNB for a 4-step contention-based random access (CBRA) procedure with a user equipment (UE) in a 5G-New Radio (NR) communication network, the baseband processing circuitry is to:
during a first step of the 4-step CBRA procedure, decode a first message (Msg1) received from the UE, the first message including a random access preamble communicated on a physical random access channel (PRACH);
during a second step of the 4-step CBRA procedure, encode a second message (Msg2) for transmission to the UE in response to the first message, the Msg2 including a random access response (RAR) with a physical downlink control channel (PDCCH), the PDCCH including a scheduled uplink (UL) grant with UL resources and an indication of a channel access type associated with an UL transmission using the UL grant, the channel access type indicating whether shared spectrum channel access is enabled for the UL transmission;
during a third step of the 4-step CBRA procedure, decode a third message (Msg3) received via a physical uplink shared channel (PUSCH) transmission from the UE using the scheduled UL resources, the PUSCH transmission using shared spectrum when the shared spectrum channel access is enabled, and the PUSCH transmission using non-shared spectrum sensed by the UE to be idle during a channel access procedure when the shared spectrum channel access is not enabled; and
during a fourth step of the 4-step CBRA procedure, encode a fourth message (Msg4) for transmission to the UE, the Msg4 associated with contention resolution.

17. The apparatus of claim 16, wherein the Msg2 includes a RAR grant field with the scheduled UL grant.

18. The apparatus of claim 17, wherein the scheduled UL grant within the RAR grant field includes a PUSCH frequency resource allocation and a PUSCH time resource allocation for the transmission of Msg3.

19. The apparatus of claim 18, wherein the RAR grant field includes the indication of the channel access type.

20. The apparatus of claim 19, wherein the indication of the channel access type is 2 bits, and wherein the PUSCH frequency resource allocation is reduced from 14 bits to 12 bits when the RAR grant field includes the indication of the channel access type.

* * * * *